Patented Feb. 25, 1936

2,032,093

UNITED STATES PATENT OFFICE 2,032,093

MONOAZO DYES AND METHODS FOR THEIR PREPARATION

Henry Jordan and Miles Augustinus Dahlen, Wilmington, Del., assignors to E. I. du Pont de Nemours & Company, Wilmington, Del., a corporation of Delaware No Drawing. Application April 30, 1932, Serial No. 608,554

6 Claims. (Cl. 8—5)

This invention relates to organic compounds and more particularly refers to monoazo dyes and methods for their production.

The object of this invention is to produce a monoazo dye having bright shades ranging from yellow to scarlet. Other objects are to produce dyes fast to washing and to light; to produce dyes which may be developed on the fiber; to produce dyes which give a perfect white with a proper reducing discharge medium. Other objects will appear hereinafter.

These objects are attained by the present invention whereby the fiber is treated in a solution of the following general formula:

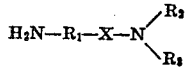

in which $R_1$ is a radical of the benzene series not containing a free sulfo or carboxy group, X is CO or $SO_2$, and $R_2$ and $R_3$ are either hydrogen or alkyl groups; the treated fiber is then diazotized in the usual way and thereafter developed with one of the customary developing agents such as beta-naphthol, resorcin, beta-hydroxy-naphthoic acid, etc.

The present invention may be more fully understood by reference to the following example:

Example

Three (3) parts of para-toluidine-o-sulfon-dimethyl-amide:

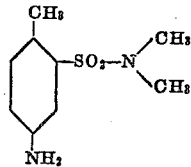

were dissolved in 6000 parts of water containing 3 parts of oxalic acid. The solution was heated to 70–80° C., 100 parts of acetyl cellulose were immersed for about 20 minutes, keeping the temperature at 70–80° C. The fiber was rinsed in cold water, then diazotized in the usual way for about 30 minutes, rinsed again in cold water, and then entered into the developer solution:

(1) 5 parts of resorcin dissolved in 4000 parts of water plus 10 parts of sodium carbonate at 20–25° C. Leave the material in solution for 15–20 minutes, then rinse thoroughly in cold water. The shade is a bright yellow.

(2) 6 parts of sodium beta-naphtholate dissolved in 4000 parts of water plus 10 parts of sodium carbonate at 20–25° C. Treat the material as in No. 1. The shade is a bright yellowish-orange.

(3) 7 parts of the sodium salt of beta-hydroxy-naphthoic acid were dissolved in 4000 parts of water, the solution was heated to 50–55° C. and acidified with acetic acid. The diazotized fiber was immersed for 15–20 minutes, maintaining a temperature of 50–55° C. Then rinsed out in cold water. The shade is a bright scarlet.

In the above example, in place of the para-toluidine-o-sulfon-dimethyl-amide, para-amino-dimethyl-benzamide, aniline-para-sulfon-dimethyl-amide, and para-amino-benzamide have been tried with very good results. In addition to these compounds aniline-para-sulfon-amide, para-toluidine-o-sulfon-amide, and similar compounds of the benzamide and sulfonamide group may be used. These compounds may be mono- or di-alkyl derivatives, preferably methyl, ethyl or butyl derivatives; they may also be meta-amino compounds instead of para-amino. Also they may have substituted in the nuclei thereof groups such as alkyl, alkoxy, nitro, halogen, and analogous groups.

Instead of dissolving the base in a solution of oxalic acid a corresponding amount of mineral acid, such as hydrochloric or sulfuric acid, may be used. Also the conditions of the process may be varied within a wide range without affecting the result.

The shades obtained from these various bases, with the same developer, are quite similar: resorcin yielding a bright yellow, beta-naphthol yielding oranges, and beta-hydroxy-naphthoic acid yielding scarlets. The choice of a developer therefore depends upon the particular shade desired.

These dyes display an exceptional affinity for cellulose esters. The shades obtained are exceedingly attractive and are in great demand by textile manufacturers who desire brilliant shades fast to washing and light. Another factor which increases the demand for these dyes is the ease with which they may be discharged to a perfect white with the proper reducing discharge medium.

As many apparently widely different embodiments of this invention may be made without departing from the spirit and scope thereof it is to be understood that we do not limit ourselves to the specific embodiments thereof except as defined in the appended claims.

We claim:

1. The process of producing a monoazo dye on a cellulose ester which comprises treating a cellulose ester with a base of the following general formula:

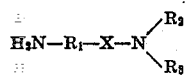

in which $R_1$ is a radical of the benzene series not containing a free sulfo or carboxy group, X is CO or $SO_2$, and $R_2$ and $R_3$ are hydrogen or alkyl groups; diazotizing the treated material and developing with a developer solution.

2. The process of producing a monoazo dye on a cellulose ester which comprises treating cellulose acetate with a base of the following general formula:

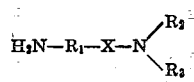

in which $R_1$ is a radical of the benzene series not containing a free sulfo or carboxy group, X is CO or $SO_2$, and $R_2$ and $R_3$ are hydrogen or alkyl groups; diazotizing the treated material and developing with a solution selected from the group consisting of resorcin, sodium beta-naphtholate, and beta-hydroxy-naphthoic acid.

3. The process of producing a monoazo dye on a cellulose ester which comprises treating a cellulose ester with an aniline sulfonamide; diazotizing the treated material and developing with a developer solution from the group consisting of resorcin, beta-naphthol, and beta-hydroxy-naphthoic acid.

4. The process of producing a monoazo dye on cellulose acetate which comprises treating cellulose acetate material with p-toluidine-o-sulfondimethylamide; diazotizing the treated material and developing with a compound selected from the group consisting of resorcin, sodium-beta-naphtholate, and beta-hydroxy-naphthoic acid.

5. A cellulose ester dyed with monoazo dyes having the following general formula:

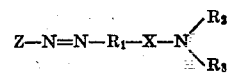

in which Z represents the residue of a developing agent from the class consisting of resorcin, beta-naphthol, and beta-hydroxy-naphthoic acid, $R_1$ represents the residue of an amine of the benzene series free from sulfonic acid and carboxylic acid groups, X represents CO or $SO_2$, and $R_2$ and $R_3$ represent hydrogen or alkyl groups.

6. Cellulose acetate dyed with monoazo dyes having the following general formula:

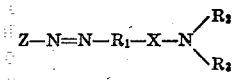

in which Z represents the residue of a developing agent selected from the group consisting of resorcin, beta-naphthol and beta-hydroxy-naphthoic acid, $R_1$ represents the residue of an amine of the benzene series free from sulfonic acid and carboxylic acid groups, X represents CO or $SO_2$, and $R_2$ and $R_3$ represent hydrogen or alkyl groups.

HENRY JORDAN.
MILES A. DAHLEN.